April 24, 1928.
C. B. CHANDLER
1,667,509
METAL WHEEL TIRE EXPANDER
Filed March 29, 1923
2 Sheets-Sheet 1
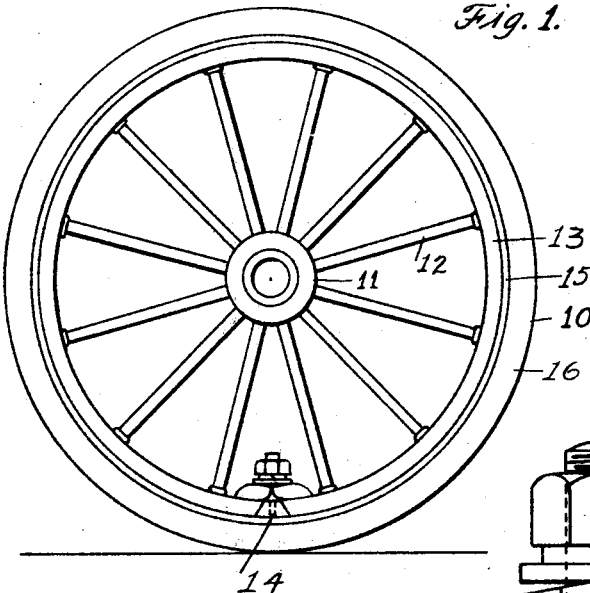
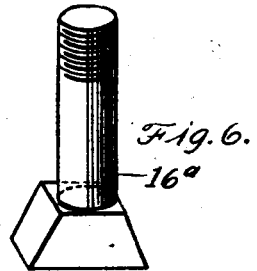
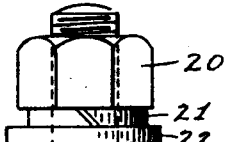
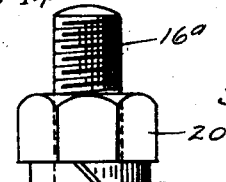
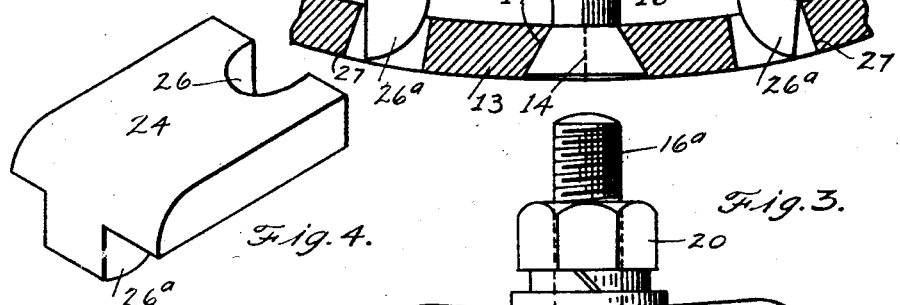
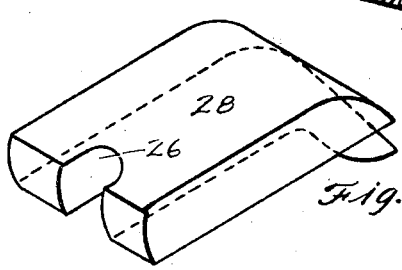
INVENTOR
Carl B. Chandler
By Sefft & Sefft
Atty's.

April 24, 1928.

C. B. CHANDLER 1,667,509

METAL WHEEL TIRE EXPANDER

Filed March 29, 1923

INVENTOR
Carl B. Chandler
By Tefft & Tefft
Atty's.

Patented Apr. 24, 1928.

1,667,509

UNITED STATES PATENT OFFICE.

CARL B. CHANDLER, OF HAVANA, ILLINOIS.

METAL-WHEEL-TIRE EXPANDER.

Application filed March 29, 1923. Serial No. 628,526.

My invention relates to metal wheels and more particularly to an expanding means therefor.

The object of my invention is in the provision of an expanding device to be used in connection with the tires of metal wheels.

Another object of my invention is in the simplicity of structure utilized whereby a multiplicity of parts is obviated and an efficiently operating device results.

A further object is in the provision of a device that is incorporated in a metal rim for expanding same within the conventional rubber tire and rim and thereby permitting ready removal and replacement thereof.

Other objects of my invention will appear in the following specification in connection with the annexed drawings.

Figure 1 is a side elevation of a metal wheel having mounted in connection therewith my rim expanding device.

Figure 2 is a side elevation, with some parts shown in section, of my expander in its normal position.

Figure 3 is a similar view of my device in its extended or expanded position.

Figures 4 and 5 are enlarged perspective views of the lever members.

Figure 6 is a perspective view of the T head bolt shown in Figures 2 and 3 respectively.

Figure 9:
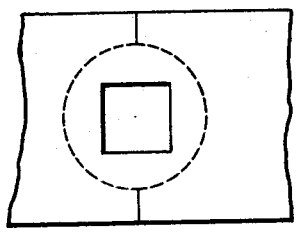
Figure 11:
Figure 10:
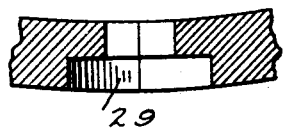

Figures 9, 10 and 11 have been included to show a modification of my device wherein a flat headed bolt is used instead of a tapered one.

With reference to the specification I have shown in Figure 1 a conventional steel wheel, having applied thereto my rim expanding device.

Figure 7:
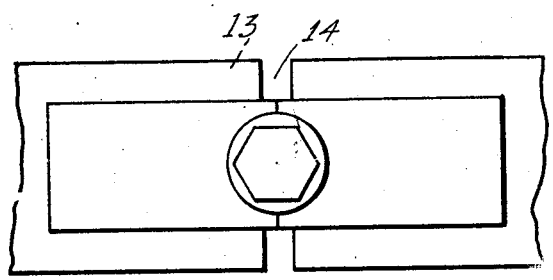
Figure 7 is a plan view of my device in its expanded position as shown in Figure 3 bringing out clearly its relation to the rim.

It may be said in explanation that my device is mainly adapted to be used in connection with steel wheels which carry thereon heavy solid rubber tires. In Figure 1 I refer to the wheel generally as 10 which includes a hub portion 11, spokes 12 and rim 13. The spokes are attached to the rim by any well known means (not shown) this not being included in any way within the scope of this invention. The rim is split at 14, this being shown clearly in Figures 7 and 8. Rim may also be split in two or more places where necessary to distribute the expanding effect of my device through the use of two or more devices. Encircling the rim is the demountable rim 15, which carries the conventional solid rubber tire 16.

To more clearly bring out the practical use of my expanding device I might say that one of the methods of applying the demountable rim and rubber tire to the rim 13 is by pressing said wheel within the rim. To do away with this difficult and expensive pressing operation, I have provided this simple expanding device. The wheel rim is made of such circumference that it may be readily inserted within the rim of the rubber tire and a consequent expansion of my device permits the rim to be forced together firmly.

The manufacture of these steel wheels to which my device is mainly applicable does not always result in an exact uniformity of size. My device is designed to operate within such a degree as to take care of any ordinary discrepancy. The wheel should be made with a sufficiently large tolerance in diameter to assure its being small enough to pass inside of the rim and rubber tire, and any excessive looseness in the contact between said wheel and rim may be compensated for by the insertion of a shim of metal or other suitable material between the wheel and rim. If in tightening the nut of my expanding device it is apparent that the levers cannot be forced to their complete seated position as shown in Figure 3 because the amount of expansion afforded is excessive, the ends of the levers may be quickly ground off sufficiently to reduce the expansive movement to the proper amount.

Figure 8:
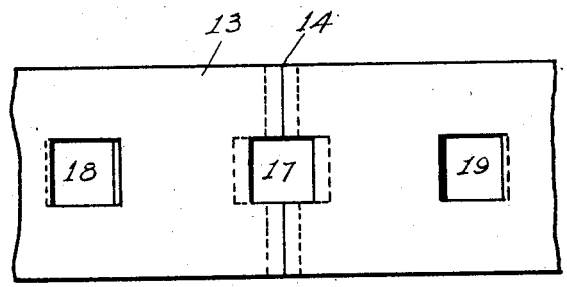
Figure 8 is a plan view of the section of the rim adapted to receive the expanding device.

Referring to Figure 2, I have shown my rim expander in its normal or rather unexpanded position. A tapered bolt 16ª is inserted through an opening 17 made in the rim 13, this opening conforming with the shape of the head of the bolt and made as shown in Figure 8 at a point intermediate the split in the said rim 13, the result being that an expansion of the rim 13 produces a similar enlargement of the bolt opening. Again in Figure 8 are shown the lever holes 18 and 19 which are made at equal distances from the main bolt hole 17. On the threaded end of the bolt is a hexagonal nut 20 and disposed thereunder a lock washer 21 and a plain washer 22. The two levers or fulcrums 24 and 28, shown in detail in Figures 4 and 5 have at their bolt ends the cut out portions 26, adapted to completely surround the body portion of the bolt, with their ends abutting on each side of the bolt, and also having at their opposite ends outwardly projecting lugs 26ª, which are adapted to be inserted in the openings 18 and 19 in the rim. It may be noticed in Figure 2 that when the levers are in an unexpanded position the lugs 26ª have an angular position with relation to the outer edges of the openings 18 and 19. These openings at their outer edges are tapered slightly as at 27. Again in Figure 2 it may be seen that the levers abut the outer side of the plain washer 22.

Assume that the rubber tire and demountable rim have been placed about the steel wheel or rim 13 and it is now desired to clamp them firmly together. This result is obtained by merely tightening the hexagonal nut upon the bolt 16ª with the result that continual depression of the nut gradually forces the inner ends of the levers outwardly, thereby expanding the outer ends with the resultant expansion of the rim 13.

This expansion of the rim is shown clearly in Figure 3. Again in this expanded position the outer edges of the lugs 26ª now coincide with the tapered edges of the openings 18 and 19, and there is provided an immovable wedge between the opposed ends of the rim. Also in Figure 3 it may be seen that the bolt hole has been considerably enlarged. However, the fact that the head of said bolt is tapered prevents its withdrawal from the rim by the subsequent tightening of the hexagonal nut on the bolt.

I have described the clamping of the rubber tire and demountable rim upon the rim 13, but my device has just as much utility in removing the demountable rim from the rim thereof. A special machine is usually used in this operation, but with my present expander, merely a release of the levers by the unscrewing of the nut permits the rubber tire rim to be quickly removed from the rim 13.

In Figures 9, 10 and 11, I have shown a modification of my device wherein a flat headed bolt 28ª is used instead of a tapered one. There is no marked difference in the operation or structure of the device other than that the shape of the bolt head and the form of the bolt opening 29 is changed.

What I claim is:

1. A device for expanding the steel felloe of a wheel into a demountable tire rim comprising a spilt steel felloe having the sections of its opposed end portions adapted to receive the head of a bolt, lever members, the ends of said levers being in abutting relation and curved to provide a rocking engagement with each other, the opposite ends of said lever members having means for engagement with the felloe, and a nut on the bolt to effect the proper spacing of the last mentioned means by engaging the adjacent ends of the levers.

2. A device for expanding the steel felloe of a wheel into a demountable tire rim comprising a split steel felloe having the sections of its opposed end portions tapered to receive the tapered head of a bolt and having apertures at similarly spaced distances from each end portion adapted to serve as lug seats, means for relatively spacing said end portions comprising a bolt having a tapered head portion, lever members each having one end thereof provided with seat for operative connection with said bolt, lugs projecting at an angle to said lever members at the opposite end thereof, said lugs being adapted to enter said lug seats, and a nut on the bolt for effecting adjustment of the lever members.

3. A device for expanding the steel felloe of a wheel into a demountable tire rim comprising a split steel felloe having the sections of its opposed end portions adapted to receive the head of a bolt and having lug seats, means for spacing said end portions relatively to each other comprising a bolt, lever members each having one end thereof provided with seat for operative connection with said bolt, said end being curved to provide a rocking abutment with the other lever member, lugs projecting from said lever members, said lugs being adapted to engage said lug seats, and a nut on the bolt to effect the proper spacing of the lugs by engaging the adjacent ends of the levers.

In testimony whereof I affix my signature.

CARL B. CHANDLER.